United States Patent Office 3,533,814
Patented Oct. 13, 1970

3,533,814
PRODUCT AGGLOMERATED FROM GRANITE
Jean Georges Leroy, Enghien-les-Bains, France, assignor to Antargaz Societe Anonyme de Distribution de Gaz, Liquides de Petrole, Paris, France, a corporation of France
No Drawing. Filed Mar. 13, 1967, Ser. No. 622,462
Claims priority, application France, Mar. 15, 1966, 53,454
Int. Cl. C04b 33/26
U.S. Cl. 106—46
4 Claims

ABSTRACT OF THE DISCLOSURE

The invention concerns a mouldable product made of a mixture of powdered granite and alkaline silicate which further contains a flux such as glass powder, and a softening agent such as clay. Said moulded product can be enameled as a pottery.

---

The object of this invention is a granite conglomerate product which is refractory, has good electrical or thermal insulation, high mechanical resistance, especially to impact, stands up extremely well to thermal shocks and which can, therefore, be put to numerous uses.

Such a product can, for instance, be used to make handles for saucepans and other household utensils, especially ovenware, burner caps, building panels, road signs, boundry or kerb-stones for roads, electrical cable insulators, etc.

Granite powder conglomerates have previously been described in French Pat. No. 873,275, then in French Pat. Nos. 1,281,242, 1,310,707 and in addition No. 82,480 to this last patent, in which powdered granite is bonded by an alkaline silicate, with or without other additions. The product according to the first of these patents gives good results, but its resistance in water is insufficient and can be improved when it is coated or impregnated with an insulating varnish. The conglomerate of Pat. 1,281,242 generally gives good results, particularly when it is given a finishing treatment in the form of an application of a metallic or plastic coating. Finally, the moulded product according to Pat. 1,310,707 and addition 82,480 which is, like the preceeding ones, a conglomerate of powdered granite and alkaline silicate with a possible addition of silica powder, has, to a certain extent, the required qualities of strength and insulation and can be enamelled easily by the conventional technique used for sheet metal and cast iron. The ability to take enamel is, moreover, increased by incorporating refractory products such as titanium oxide or alumina in the mixture.

In all the above-mentioned cases the manufacturing process comprises the preparation of a mixture of powdered granite and the other solid components with a sodium silicate solution in a proportion sufficient to form an easily worked paste, this proportion being in the range of 20% by weight. The paste is pressure moulded, and then dried, and when the dry moulded article has acquired its setting consistency it is given the metallic or plastic coating which is fired on in the usual manner.

The said products made from powdered granite have moderately good properties of heat resistance and mechanical strength; they are suitable for electrical insulation for voltages in the range of 200 to 300 volts, but the properties of all these products are variable, and moreover the fact that they more or less swell in water is always a great drawback and in practice their resistance to freezing is practically non-existent.

Research carried out by the inventor has proved that by using the alkaline silicate as an agent to give the paste consistency, and powdered glass as a bond, a moulded powdered granite product is obtained which has, simultaneously, mechanical strength, resistance to thermal shocks and properties of thermal insulation which are very superior to those of the above-mentioned products, while providing electrical insulation up to 40,000 volts and excellent resistance to freezing, and swelling in water. The object of the invention is such a product which, furthermore, it is possible to coat with an enamel of the type used in the pottery industry. The mouldable product according to the invention can be machined, especially by drilling and sawing.

According to the invention, a mouldable product made of powdered granite and alkaline silicate is characterized in that it contains a flux such as glass powder and a softening agent such as rich clay; the said components being cold formed and then heated to a temperature which is at least equal to the softening temperature of the flux.

To prepare the product, powdered granite, clay and glass powder are mixed and sodium silicate is added to form a paste suitable for moulding. After cold forming under pressure the moulded article can be coated with enamel and fired in a kiln. The article then undergoes vitrification which simultaneously agglomerates the elements of the mixture and fires the enamel.

Alternatively a double firing may be effected by firing the moulded article to ensure its vitrification, and thereafter applying the enamel and firing it at a temperature of about 1000 to 1050° C.

By raising the mixture of powdered granite, clay silicate and glass powder to the temperature at which glass softens, vitrification of the glass powder occurs, which ensures the consistency and cohesion of the final product; whereas in the manufacture of known products silicate forms the bond or binder and causes agglomeration of the granite particles, in the product according to the invention the silicate solution used according to the invention is only intended to give the paste consistency, and does not act as a binder; agglomeration is not caused by the silicate, but by the glass in a molten or softened state. The silicate, therefore, ensures consistency and binding of the grains, more especially during moulding, and until the glass takes over its function as the real binder.

The cold moulded product according to the invention is perfectly suited to the enamels usually used in pottery making, and pottery enamels adhere to the moulded articles without cracking, the phenomenon which is so feared by enamellers.

The articles so obtained are particularly resistant to mechanical or thermal shocks. They are very much less fragile than pottery. They are excellent electrical and thermal insulators, resistant to swelling in water, and stand up to successive freezing and thawing. They are made of granite waste and their cost price is particularly low. They can be used to advantage in numerous applications for which pottery is unsuited.

The granulometry, nature and percentages of the components are determined according to the properties sought for in the final product, such as its greater or lesser degree of hardness, and insulating qualities.

The granite used is preferably selected from non-friable granites with a high mica content; it should be noted that the finer the grain the less resistant the finished article is to thermal shocks. The granite is used in amounts of from about 37 to 85 percent. A granulometry corresponding to 40 to 150 mesh screens (AFNOR moduli about 25 to 21) provides, together with the other given qualities, very good resistance to thermal and mechanical shocks. A very much finer granulometry (AFNOR moduli about 25 to 19) provides middling resistance to thermal shock and good mechanical strength, together with the other qualities mentioned.

A rich clay is used for preference, to the extent of 0 to 25%, and preferably about 20% by weight of the mixture; in order to take advantage of the softening power of this material and so that the "green" product has greater solidity the dampness ratio is selected to provide a consistency similar to that of foundry sand. The preferred granulometry is that of a 50 mesh screen (AFNOR modulus 27). The percentage of clay is selected as a function of the shape of the workpieces to be cast and increases with the complexity of this shape; it should also be remembered that the amount of clay should be less as the precision required for sizes of the workpieces increases.

Laboratory tests enable the best ratio to be established easily. The alkaline silicate, preferably sodium silicate, makes up for about between 5 and 13%, and generally from about 5 to 7% by weight of the product. The exact amount is selected to ensure the best plasticity; this amount varies as does the amount of clay.

Finally, the glass powder used amounts to about between 10 and 25% by weight of the product; the amount of glass powder used, and its nature, is selected taking into account the temperature to be used for subsequent glost firing. Advantageously, glass powders of the granulometry corresponding to a 60 to 200 mesh screen (AFNOR moduli about 25 to 19) are used. The glasses used for these powders are advantageously those supplied by the "Centrale de Verreries" Company, under the headings: :"Glass powder 160J," "Glass powder 200V" and "Glass powder 200 TVJ."

Treatment of the moulded article when it has been enamelled is carried out in a kiln at a temperature rising by stages of from 120 to 140° C. per hour up to about 1150° C., as in pottery glost firing. For the choice of the final temperature it is naturally necessary to take into account the vitrification temperature of the granite which in general lies in the range of about 1050 to 1100° C.

When the moulded product is subjected to double firing, the same heat gradient as is given hereinabove is applied, with a vitrifying temperature of about 750° C., which varies according to the size of the workpieces, enamel is then applied an the temperature is raised progressively to about 1000 to 1100° C.

For the manufacture of saucepan handles or burner caps the following mixture is used:

Powdered granite, 600 g. 40 mesh screen (AFNOR modulus 27)
Clay or kaolin, 200 g. 50 mesh screen (AFNOR modulus 26)
Glass powder, 200 g. 60 mesh screen (AFNOR modulus 23)

These components were mixed in a mixing machine with blades, of the type used for foundry sand, with the addition of 75 cm.$^3$ of a sodium silicate solution at 38° Baumé.

The paste obtained was placed in moulds and moulded at a pressure of 500 kg./m.$^2$.

The moulded articles were coated with a pottery type enamel and fired in a kiln at about 1000 to 1050° C.

For manufacturing 30,000 volts insulators the same proportions of the products were used, with a finer granite, passing through a 100 mesh screen (AFNOR modulus 23).

All the above-mentioned products possess the desired combined properties of thermal insulation, resistance to mechanical and thermal shocks, resistance to water and frost.

What I claim is:

1. Mouldable conglomerate product consisting essentially of a mixture of from 37–85 percent powdered granite, 5–13 percent alkaline silicate, 0–25 percent powdered clay, and 10–25 percent glass powder, the percentages being by weight of the mixture.

2. Mouldable conglomerate product according to claim 1 wherein said powdered granite has a granulometry of from 40 to 150 mesh, said clay has a granulometry of about 50 mesh, and said glass powder has a granulometry of from 60 to 200 mesh.

3. Mouldable conglomerate product according to claim 2 wherein said alkaline silicate is present at from 1 to 7 percent and said clay is present in an amount of about 20 percent.

4. Process for manufacturing a conglomerate product characterized in that the agglomerated mixture consisting essentially of from about 37–85 percent powdered granite, 5–13 percent alkaline silicate, 0–25 percent powdered clay, and 10–25 percent glass powder is moulded at pressure in the range of 500 kg./cm.$^2$, then heated progressively to a temperature at least equal to the softening temperature of the glass powder.

References Cited

UNITED STATES PATENTS 433,129  7/1890  Lea ----------------- 106—68

JAMES E. POER, Primary Examiner

U.S. Cl. X.R.

106—84